L. C. REESE.
MACHINE FOR MOLDING DOUGH AND THE LIKE.
APPLICATION FILED JUNE 19, 1916.

1,226,250.

Patented May 15, 1917.
9 SHEETS—SHEET 1.

Fig. 1

WITNESSES:

INVENTOR.
Louis Charles Reese,

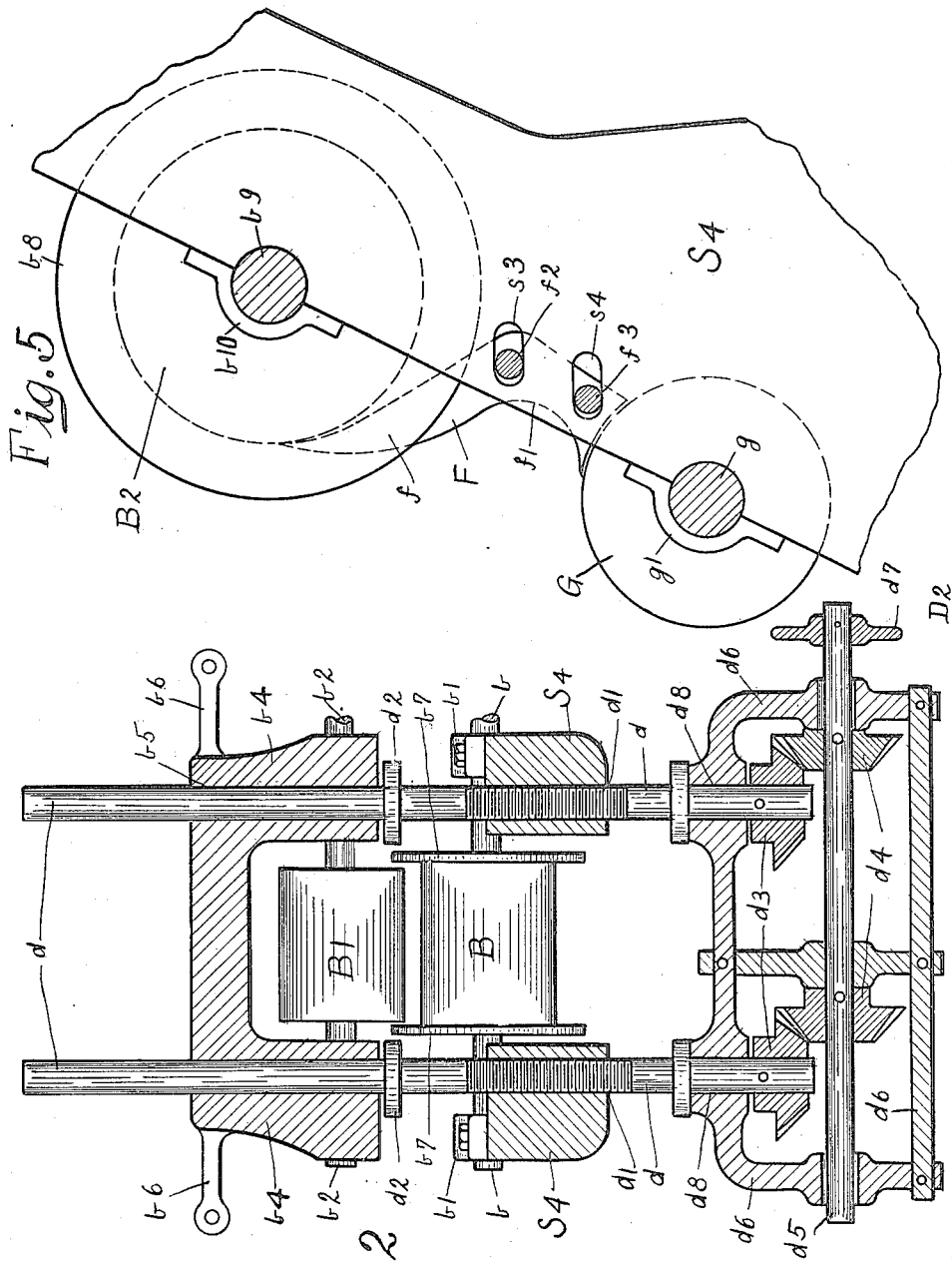

L. C. REESE.
MACHINE FOR MOLDING DOUGH AND THE LIKE.
APPLICATION FILED JUNE 19, 1916.

1,226,250.

Patented May 15, 1917.
9 SHEETS—SHEET 3.

WITNESSES:
Emelie M. Andre
Jean Niessen

INVENTOR.
Louis Charles Reese,

L. C. REESE.
MACHINE FOR MOLDING DOUGH AND THE LIKE.
APPLICATION FILED JUNE 19, 1916.

1,226,250.

Patented May 15, 1917.
9 SHEETS—SHEET 4.

WITNESSES:

INVENTOR.

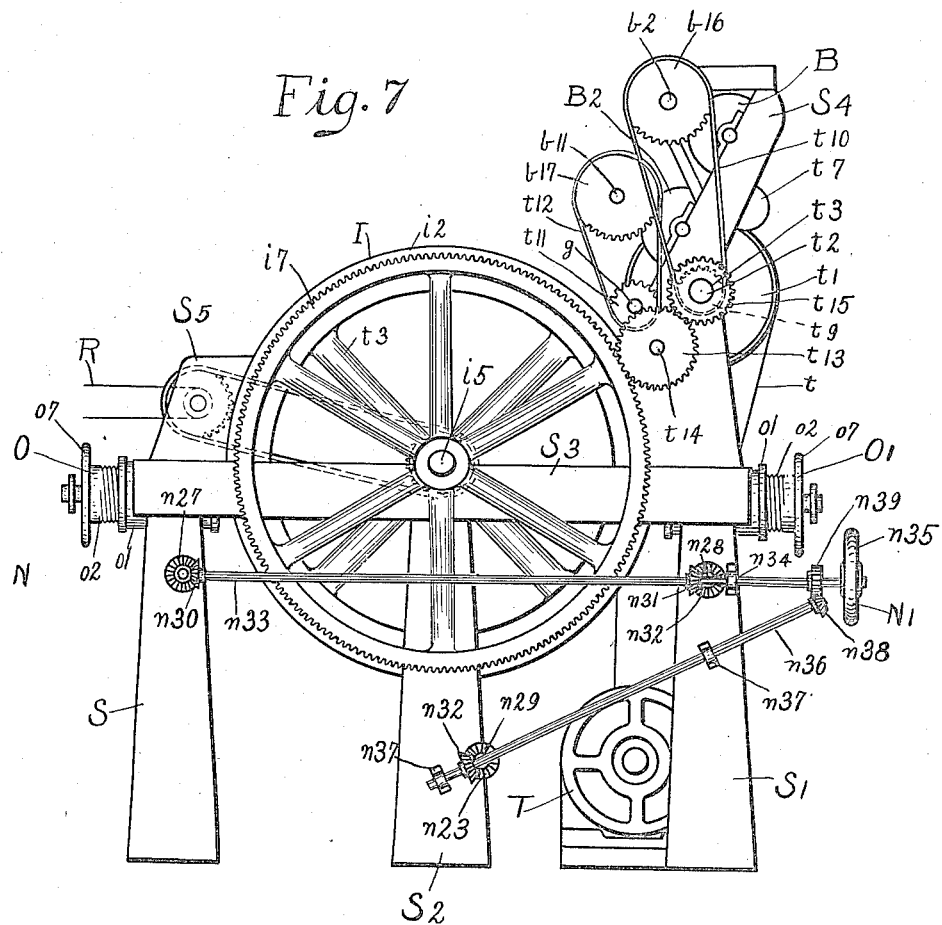

L. C. REESE.
MACHINE FOR MOLDING DOUGH AND THE LIKE.
APPLICATION FILED JUNE 19, 1916.
1,226,250.
Patented May 15, 1917.
9 SHEETS—SHEET 6.
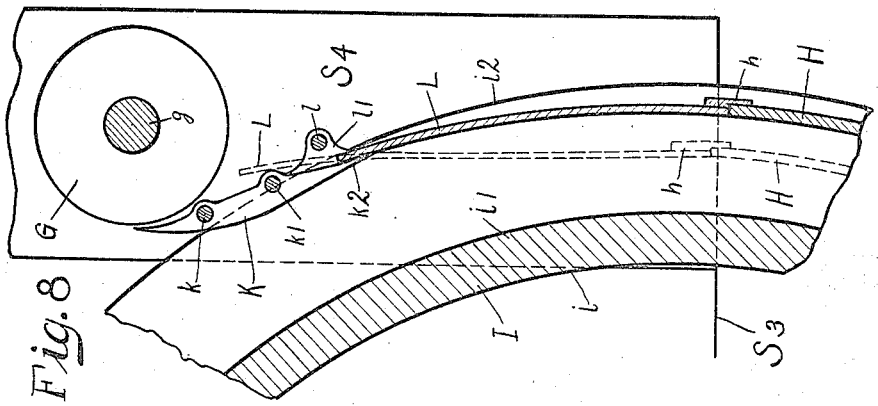
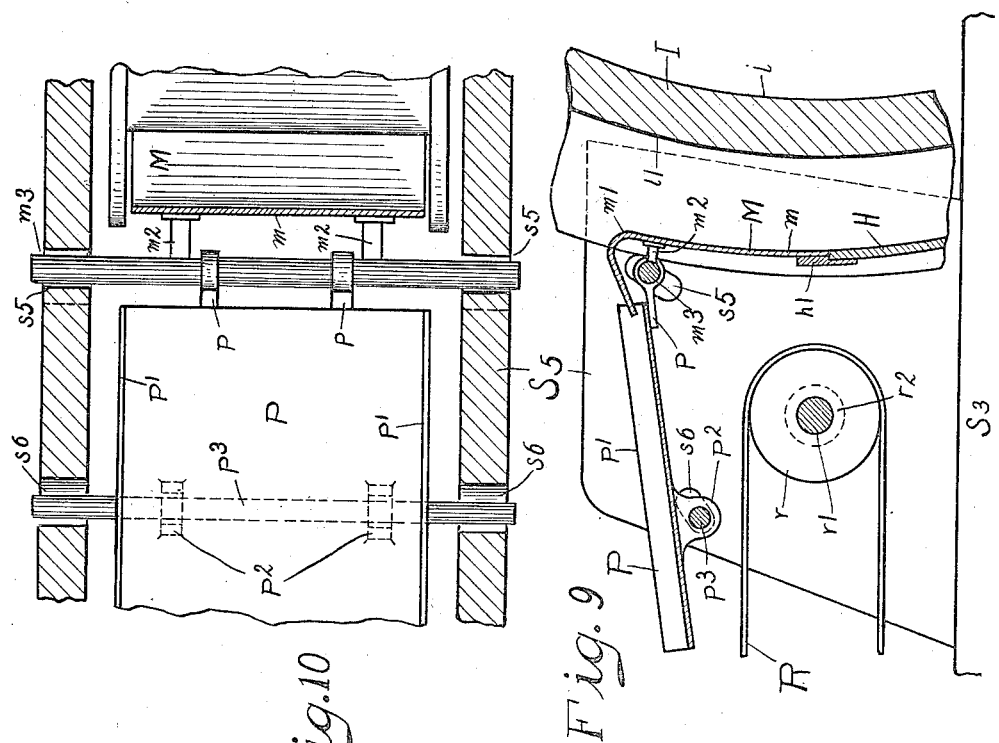
WITNESSES:
INVENTOR.

L. C. REESE.
MACHINE FOR MOLDING DOUGH AND THE LIKE.
APPLICATION FILED JUNE 19, 1916.
1,226,250.
Patented May 15, 1917.
9 SHEETS—SHEET 7.
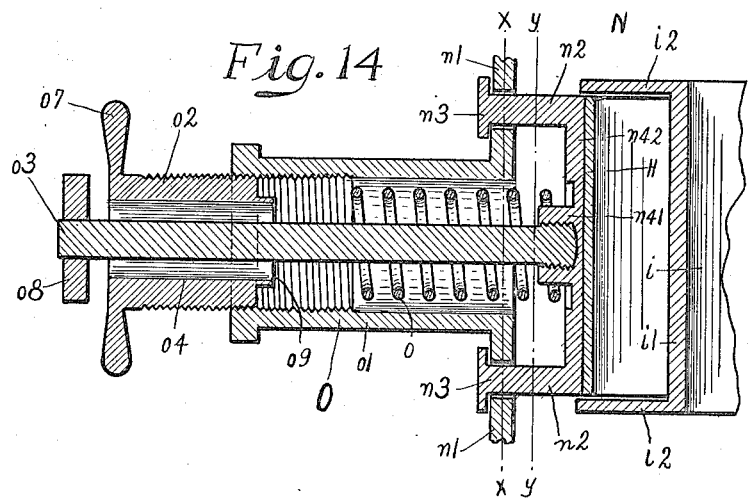
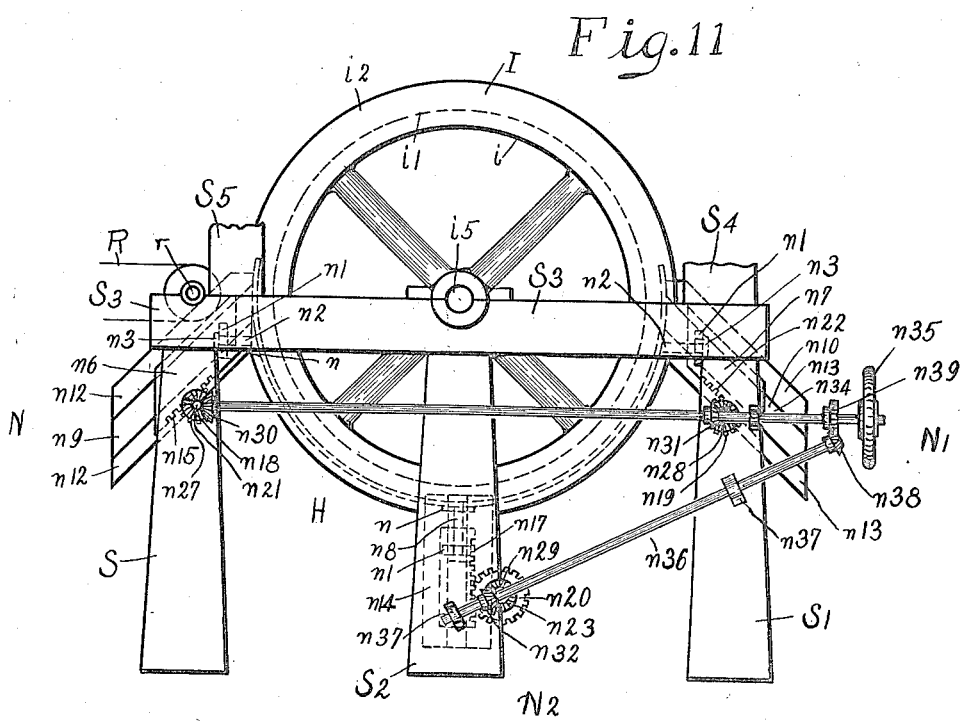
WITNESSES:
INVENTOR.

L. C. REESE.
MACHINE FOR MOLDING DOUGH AND THE LIKE.
APPLICATION FILED JUNE 19, 1916.

1,226,250.

Patented May 15, 1917.
9 SHEETS—SHEET 8.

WITNESSES:
Emelie M. André
Jean Niessen

INVENTOR.
Louis Charles Reese,

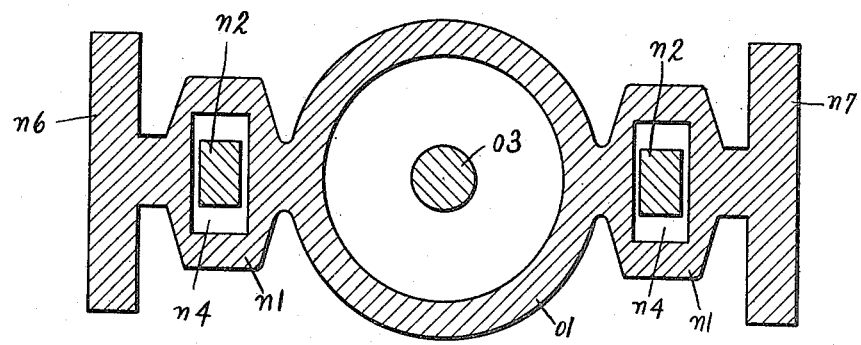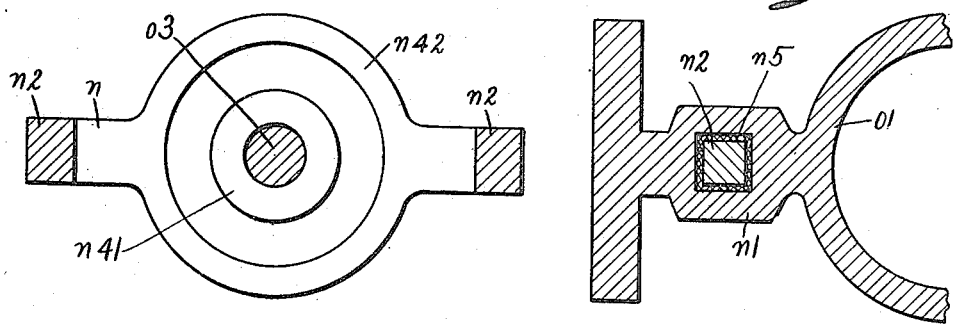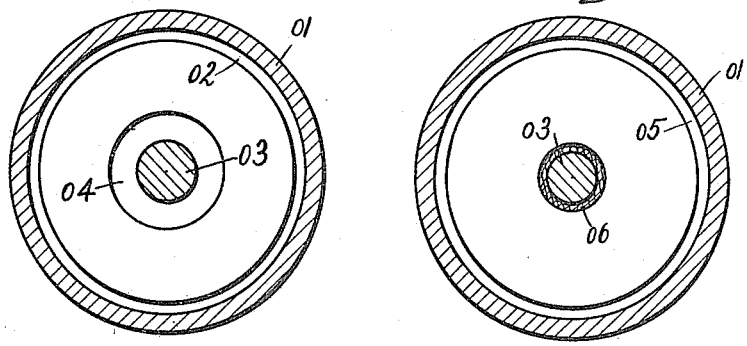

UNITED STATES PATENT OFFICE.

LOUIS CHARLES REESE, OF SAGINAW, MICHIGAN, ASSIGNOR TO WERNER & PFLEIDERER CO., OF SAGINAW, MICHIGAN.

MACHINE FOR MOLDING DOUGH AND THE LIKE.

1,226,250. Specification of Letters Patent. Patented May 15, 1917.

Original application filed October 2, 1915, Serial No. 53,842. Divided and this application filed June 19, 1916. Serial No. 104,558.

*To all whom it may concern:*

Be it known that I, LOUIS CHARLES REESE, a resident of Saginaw, in the county of Saginaw and State of Michigan, have invented new and useful Improvements in Machines for Molding Dough and the like, of which the following is a specification.

This invention relates to improvements in machines for sheeting, rolling and finally forming pieces of dough into the required shape, ready for the oven; and its object is to accomplish this result in a more efficient and perfect manner than was hitherto possible in this kind of machine.

I attain these objects by a number of novel and improved devices, mechanisms, arrangements and combinations of parts, all of which are fully described on hand of the accompanying drawings specifically produced and in the appended claims.

The main feature of my invention is that in those parts of the machine in which the dough is subjected to considerable pressure, namely in the dough sheeting and loaf forming operation, I make the parts producing the pressure not only adjustable in regard to their distance from each other, but also resilient by simple devices adapted to regulate the resiliency according to the nature of the dough. In the machines of this kind hitherto constructed the openings through which the pieces of dough are pressed, are in most cases made adjustable, but not resilient, so that the dough is forced through without any chance of redress in case the openings should not be in accordance with the nature of the dough. The consequence is that in such cases the whole quantity or larger portion of the carbonic acid gas which has been formed in the dough by means of the tedious and costly process of fermentation in order to obtain a light and spongy loaf, is forcibly driven out and must be reproduced therein, before it can be put into the baking oven. In my machine on the contrary, in which in consequence of its resilient devices the dough is not exposed to such a severe treatment, the carbonic acid gas contained in same is completely or for the most part retained, and thus a great saving in time and in raw material by the decomposition of which the carbonic acid gas is formed, is effected.

The drawings represent, as example of the application of the invention, a machine for molding bread dough into tin loaves but— of course—it will be understood that I do not wish to be limited to this machine specifically, as the invention may be readily adapted and employed with the greatest ease in other machines for molding dough or other plastic material into other shapes and forms.

Figure 1 is a side elevation of the machine showing its various parts and their general arrangement, the upper rollers of the dough sheeting apparatus being made resilient by a weight appliance and the bottom-plate of the loaf forming part of the machine by means of spring devices.

Fig. 2 is a cross section of the device for the adjustment of the upper rollers of the sheeting apparatus.

Fig. 5 represents the dough folding apparatus.

Fig. 6 and Fig. 7 are opposite elevations showing the driving arrangement and gearing of the machine at both sides.

Fig. 8 is a section through the arrangement of the inlet and Fig. 9 of the outlet of the loaf-forming apparatus.

Fig. 10 is a plan of the latter arrangement.

Fig. 11 is a side elevation of the loaf-forming apparatus itself and of the frame work carrying same, showing the rack arrangement for adjusting the distance between the bottom plate and the face of the reel.

Fig. 14 shows a cross-section of this spring arrangement, and its position and working in regard to the reel, the bottom plate and the device for adjusting the distance between the latter and the face of the reel.

Fig. 15 is a cross-section through the spring casing and the screw block adjusting the spring as arranged at the sides of the bottom plate, and Fig. 16 is a cross-section through the same appliance as employed at the middle, the lowest point of the bottom plate.

Fig. 17 is an enlarged vertical section of the spring casing and side-bearer bars through the line X—X of Fig. 14, and Fig. 18 is the same section of the spring casing and the bottom bearer-bar.

Fig. 19 is a section of the guide-blocks attached to the bottom-plate on line Y—Y of Fig. 14.

Like letters and like letters with like numerals added thereto indicate like parts in all figures.

Figure 4:
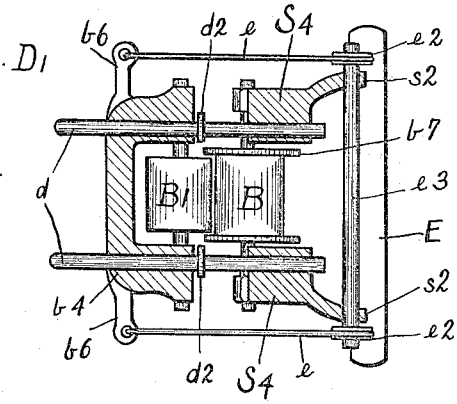
Fig. 4 is a cross-section of same.

A is the hopper for feeding the machines.

B, $B_1$, $B_2$ and $B_3$ are the brake rollers between which the dough is rolled out to a sheet and which, together with the bridge-plate C, form the sheeting apparatus of the machine. B and $B_1$ are called the upper pair, and $B_2$ and $B_3$ the lower pair of rollers. $B_1$ and $B_3$ form the top, and B and $B_2$ the bottom rollers. All rollers are rotated in the direction of the dough that is, downward; therefore B and $B_2$ revolve in opposite direction to $B_1$ and $B_3$. The bottom rollers are provided at their sides with guide-plates, which, together with the guide-bridge C, lead the dough from the upper pair to the lower pair of rollers and then to the folding apparatus of the machine.

D and $D_1$ are the devices for adjusting the distance between the top and bottom rollers, D serving for the upper and $D_1$ for the lower pair of rollers.

These devices consist of guide rods arranged at each side of the upper and lower pair of rollers vertically to the sheet of dough and provided with stops on which the guide blocks of the upper rollers rest, and with screw threads turning in the female threads of screw blocks fixed to or of projections of the stationary frame work supporting the machine.

The pair of guide rods D are turned simultaneously by the bevel gearing $D_2$, and $D_1$ by $D_3$. In this way, as all the screw threads and bevel wheels are the same, the rods with their stops and thereby the upper rollers are moved to the same degree upward or downward according to the direction in which the bevel-gearing belonging thereto is turned. The guide blocks of the upper rollers are held in position on the stops of the guide blocks belonging thereto by the weight arrangement E and $E_1$ respectively. The degree of resiliency is changed by decreasing or increasing the weights used. The completely sheeted piece of dough passes gradually, as it leaves the sheeting rollers, to the folding apparatus in order to be formed into a roll. The sheet of dough moves, guided by the upper convex part of the folding member F, onto the folding roller G which, revolving toward the surface of F, drives the dough against the concavity of the curved lower part of F whereby the dough sheet is rolled up. The folding member is preferably made adjustable in order to regulate its position in regard to the folding roller G in accordance with the size of the piece of dough to be worked, and with that of the roll to be produced therefrom. The roll of dough is then definitely formed into the required loaf shape in the molding channel formed by the face and sides of the rotating reel I and the stationary, adjustable bottom plate H with the fixed inlet plate K and the adjustable, intermediate plate L at the inlet side, and with the adjustable plate M at the outlet side of the channel.

In order to regulate the size and shape of the cross section of the above described molding channel according to the weight, volume, density and resiliency of the roll of dough to be formed to loaves therein, the bottom plate H is provided with the rack-devices N, $N_1$ and $N_2$, Fig. 11.

When ready adjusted, the bottom plate H is kept in its position by the spring devices O, $O_1$ and $O_2$. The resiliency of the bottom plate thus obtained is regulated by adjusting the length and tension of the springs employed.

P is the chute leading the completely molded loaf of dough from the outlet M of the molding channel to the belt conveyer R carrying it to its destination.

In the framework of the machine, S, $S_1$ and $S_2$ indicate the three pairs of legs of the machine carrying at their inner sides the racks of the bottom plate adjustment and at the top the horizontal main frame $S_3$. The latter supports the axle of the molding reel I and the side structures $S_4$ and $S_5$.

$S_4$ carries the hopper A at its top, below same the whole sheeting apparatus, then the folding member F, the axle of the folding roller G, the driving gear of the machine and the inlet-plate K.

$S_5$ serves as support for the outlet plate M, the chute P and the axle of the roller for the belt conveyer R.

Figure 6:
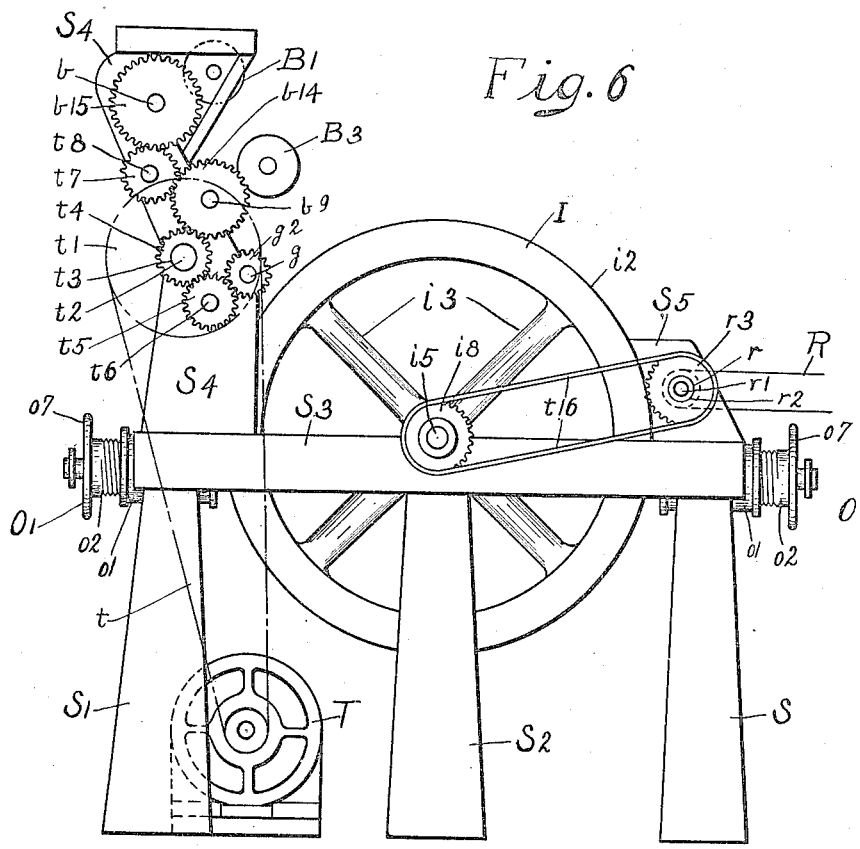
Figure 12:
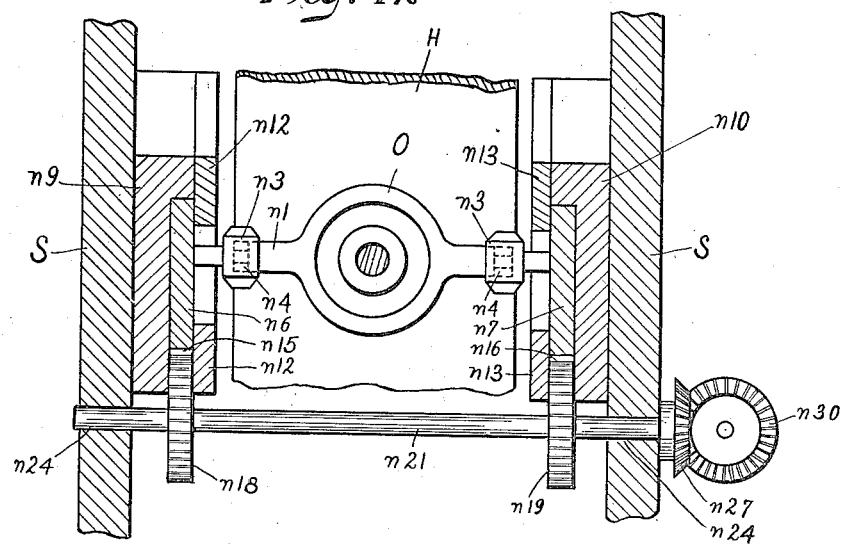
Fig. 12 is a vertical cross-section of the side adjustment and Fig. 13 a cross-sectional plan of the bottom-adjustment of the bottom plate.
Figure 13:
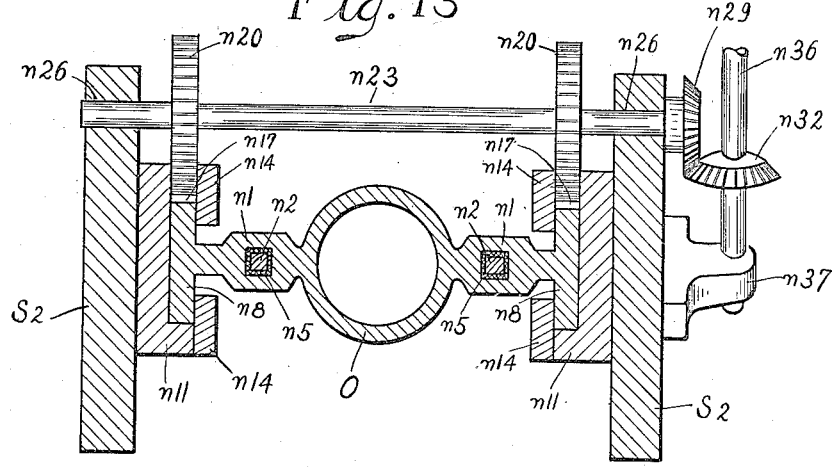

T, Figs. 6 and 7, is the electric motor for driving the gearing of the machine.

I am now going to describe the various parts of the machine, their connection with and their position toward each other in a more detailed manner.

The hopper A is so constructed and arranged at the top of the framework $S_4$ that the dough pieces dropped thereon slip easily without the slightest hindrance between the rollers B and $B_1$. In the devices D, Fig. 2, for adjusting the distance between the rollers B and $B_1$, the guide rods $d$ are provided with the screw threads $d_1$ and held by and turning in the female threads $s_1$ of the projections $s$ on the inner sides of the frame $S_4$. The shaft $b$ of the roller B is carried by the bearings $b_1$ arranged on the stationary frame $S_4$, and the shaft $b_2$ of the rollers $B_1$ rotates in bearings $b_3$ provided in the blocks $b_4$ sliding on the guides $d$ by means of the channels $b_5$ arranged in the block $b_4$ and exactly fitting to the rods $d$. The latter are provided with the stops $d_2$ to carry the movable block $b_4$, and turned by the bevel gearing $D_2$. The latter consists of the bevel wheels $d_3$ fixed to the end of the guide rods $d$ below the screw threads $d_1$ and engaging with the bevel wheels $d_4$ fixed to the shaft $d_5$ turnable in the frame $d_6$ by means of the hand wheel $d_7$. The frame $d_6$ is provided with the bearings $d_8$ arranged between the bevel wheels $d_3$ and the stops $d_9$ attached to the guide rods $d$, so that, when the hand wheel $d_7$ is turned, the bevel wheels $d_4$, fixed to the shaft $d_5$, remain in gearing with the bevel wheels $d_3$ fixed to the guide rods $d$, the frame $d_6$ being held in position by the bearings $d_8$. Thus, the guide rods $d$ are simultaneously turned in the latter and moved up and down by means of the screw threads $d_1$ and $s_1$, lifting or lowering the block $b_4$ carrying the upper roller $B_1$, at both ends at the same time and to the same degree.

Figure 3:
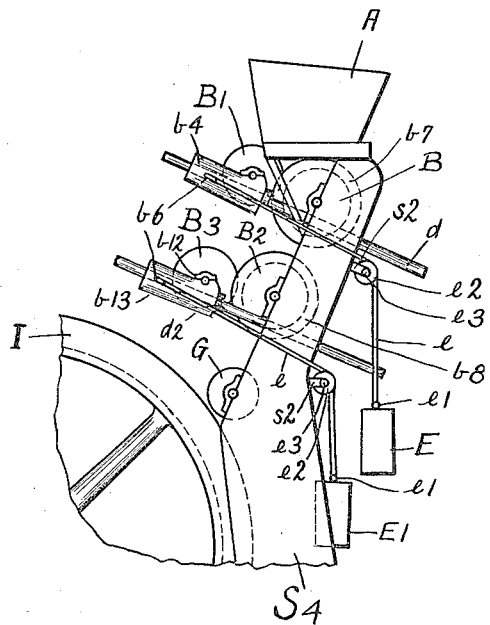
Fig. 3 represents the arrangement for making the upper rollers of the sheeting apparatus resilient by means of weights, in longitudinal section.

The blocks carrying the upper rollers are kept in their position on the stops $d_2$ (Fig. 1, Fig. 3 and Fig. 4) by means of the weights E and $E_1$ carried by steel wires $e$ fixed to same by means of the hooks $e_1$. These wires $e$, Fig. 4, run along each side of the rollers B and $B_1$ over the grooved wheels $e_2$ turning around the cross bar $e_3$ fixed by means of the supports $s_2$ to the stationary framework $S_4$ of the machine, and are fastened by means of the hooks $b_6$ to the sides of the movable block $b_4$, carrying the upper roller $B_1$.

The rollers B and $B_2$ are provided at their sides with the circular plates $b_7$, respectively $b_8$, reaching over the lower part of the rollers $B_1$, respectively $B_3$, for preventing the sheet of dough from becoming broader than the rollers.

The lower pair of rollers, $B_2$ and $B_3$, are equipped with the adjusting devices $D_1$ and the weight appliance $E_1$ which are constructed in their details and work exactly as those devices for the upper pair of rollers B and $B_1$.

The straight steel plate C, Fig. 1, is fixed to the framework $S_4$ of the machine and constructed of such a shape as to lead the dough treated in the rollers B and $B_1$ from between the side plates $b_7$ to the rollers $B_2$ and $B_3$ in between the side plates $b_8$ of the rollers $B_2$.

The shaft $b_9$ of the roller $B_2$ turns in the bearings $b_{10}$, (Fig. 1), arranged at the stationary framework $S_4$ and the shaft $b_{11}$ of the roller $B_3$ in the bearings $b_{12}$ carried by the movable block $b_{13}$ sliding on the guide rods of the adjusting devices $D_1$.

The upper convex part $f$ of the folding member F is shaped to receive the dough from between the rollers $B_2$ and $B_3$ and must therefore fit between the side plates $b$ of the roller $B_2$, while the lower curved part $f_1$ of F has the width of the folding roller G. The folding member F is attached to the frame $S_4$ by means of the screw studs, $f_2$ and $f_3$, provided at each side of F. For adjusting the position of the latter, the slots $s_3$ and $s_4$ are provided at each side of the frame $S_4$ for the studs $f_2$ and $f_3$.

In order to fix the plate F in its adjusted position, it is clamped to its supports $S_4$ by any known means, for instance screw nuts fitting over the threaded ends of the studs $f_2$ and $f_3$ protruding outside the supports $S_4$, and pressing against same.

The folding roller G has preferably a corrugated surface, and its shaft $g$ turns in bearings $g_1$ carried by the framework $S_4$.

The folding roller G and its shaft $g$ are arranged parallel to and underneath the sheeting rollers $B_2$ and $B_3$ at such a point that the sheet of dough leaving these rollers drops on the roller G just above its center. As soon as the dough touches the roller G which rotates quicker than the rollers $B_2$ and $B_3$, it is caught up by G and thrown into the concavity formed by the concave part $f_1$ of the folding member F toward which the roller G revolves. This concavity is so constructed and arranged in regard to the rollers G and $B_2$ that those parts of the dough sheet coming from the roller G glide at first upward on the surface of the concave part $f_1$, turn sidewise at its upper part and then drop downward by their own gravity. These parts of the dough sheet meet thus the parts subsequently arriving from the roller G and roll themselves up with same. The rolled up parts are held in their place between the concave part $f_1$ of the member F and the top of the roller G by the fresh parts of the dough sheet passing downward from between the rollers $B_2$ and $B_3$ toward the folding roller G and kept in tension by the latter revolving quicker than the former. The size of the cross-section of the space between the concave part $f_1$ of the folding member F and the dough sheet passing down from the sheeting rollers $B_2$ and $B_3$ on to the center of the folding roller G is about half that of the cross section of the finished cylindrical roll obtainable from the dough sheet prepared in the sheeting apparatus, and is adjusted according to the quantity of dough used for each sheet and the size of the sheets made, by adjusting the position of the member F in the manner described above. As soon as the last part of the dough sheet has left the sheeting rollers $B_2$ and $B_3$, the tension on the dough roll forming in the concavity of the member F ceases, and the now completed roll drops by its own gravity over the opposite side of the roller G onto the inlet plate K of the molding channel and then into the latter.

The electric motor T drives by means of the belt $t$ the main pulley $t_1$ fixed to the main shaft $t_2$ rotating in bearings $t_3$ arranged in the framework $S_4$, (Fig. 6 and Fig. 7).

On that end which carries the driving pulley $t_1$ (Fig. 6), the driving shaft $t_2$ is provided with the gear wheel $t_4$ which meshes with the gear wheel $b_{14}$ fixed to the shaft $b_9$ of the roller $B_2$, which is thus rotated; $t_4$ also meshes with the idler $t_5$ rotating around the lug $t_6$ arranged at the framework $S_4$ and meshing with the gear-wheel $g_2$ fixed to the shaft $g$, and thus drives the roller G. The gear wheel $b_{14}$ meshes with the idler $t_7$ rotating around the lug $t_8$ fixed to the framework $S_4$, and, meshing with the gearwheel $b_{15}$ arranged at the shaft $b$, drives the roller B.

In Fig. 6 the gear wheel $g_2$ driving the folding roller G is shown as being of half the size as the gear wheel $b_{14}$ driving the roller $B_2$, and both being driven—$b_{14}$ directly and $g_2$ through the idler $t_5$—by means of the gear-wheel $t_4$ fixed to the main driving shaft of the machine, the folding roller G rotates with double the velocity as the sheeting roller $B_2$ does.

On the opposite side of the driving pulley $t_1$ (Fig. 7) the driving shaft $t_2$ carries the sprocket wheel $t_9$ which by means of the chain $t_{10}$ drives the sprocket wheel $b_{16}$ attached to the shaft $b_3$ and thus the roller $B_1$, and the driving shaft $g$ of the folding roller G carries the sprocket wheel $t_{11}$ which by means of the chain $t_{12}$ drives the sprocket wheel $b_{17}$ fixed to the shaft $b_{11}$ and thereby the roller $B_3$.

The reel I consists of the ring $i$ the face of which is indicated by the letter $i_1$, and the two sides $i_2$ of the rim. The ring $i$ is supported by the spokes $i_3$ and the crown $i_4$ fixed on the axle $i_5$ passing through the center of I. The axle $i_5$ revolves in bearings $i_6$ arranged at the horizontal framework $S_3$ of the machine. The reel I is rotated by means of the gear wheel $i_7$ fixed to the axle $i_5$ and meshing with the idler $t_{13}$ rotating around the lug $t_{14}$ fixed to the frame $S_4$ and meshing with the gear wheel $t_{15}$ attached to the driving shaft $t_2$ of the machine on the side opposite to the driving pulley (Fig. 7).

The bottom plate H fits loosely into the channel formed by the face $i_1$ and the sides $i_2$ of the reel I and, following in outline the circumference of the lower half of the latter, is the stationary bottom of the molding or loaf shaping channel of the machine. At the inlet side for the dough to the channel the bottom plate H is connected by means of the cross bar $h$ with the intermediate plate L made of thin flexible steel, and at the outlet side for the dough from the channel, by means of the crossbar $h_1$ with the outlet plate M made of the same material as L, (Fig. 8 and Fig. 9).

The inlet plate K has nearly the width of the molding channel, fitting loosely into the same, and is curved following the circumference of the reel; it is fixed to the framework $S_4$ by means of the screw studs, $k$ and $k_1$, arranged at each side of the plate (Fig. 8).

The inlet plate K ends in the knife-link edge $k_2$ between which and the cross bar $l$ arranged at the framework $S_4$ the intermediate plate L is able to slide, following the movements of the bottom plate H. The cross bar $l$ is provided with the lugs $l_1$, nearly touching the rim $i_2$ of the reel, in order to prevent any side slip of the plate L. Fig. 8 shows the latter and the bottom plate in two different positions fully explaining the working of the arrangement just described.

The rack devices (Fig. 11), N and $N_1$, serve to adjust the sides, and the rack devices $N_2$ the lowest point of the bottom plate H. The guide blocks $n$ are the same for all these devices, while the bearer bars $n_1$ which with the guide blocks $n$ form the immediate support of the bottom plate H, differ from each other, the bars $n_1$ belonging to the side devices N and $N_1$, being provided with the slots $n_4$ (Fig. 17) to give some play to the guide rods $n_2$ of the guide blocks $n$, while the bearer bar $n_1$ belonging to the bottom device has closely fitting openings $n_5$ (Fig. 18) in which the guide rods $n_2$ move like in a stuffing box.

The guide rods $n_2$ for the sides of the bottom plate H are horizontal and slide in slots giving vertical play, while those arranged at the lowest point of H are vertical and slide in tight vertical openings. The guide rods $n_2$ are provided with stop plates $n_3$ (Fig. 14) against which the bearer bars $n_1$ are pressed by the spring devices O, $O_1$ and $O_2$.

The bearer bars $n_1$ employed at the sides of the bottom plate H are fixed at one end to the sliding rack blocks $n_6$ and at the other end to the sliding rack blocks $n_7$. The rack blocks $n_6$ and $n_7$ move in channels formed by the back blocks $n_9$ and $n_{10}$ securely fastened to the legs S, respectively $S_1$ of the framework of the machine, and by the stop blocks $n_{12}$ and $n_{13}$. These channels slant upward toward the bottom plate H, so that, when the rack blocks are moved in the channels upward and toward the bottom plate H, the latter is lifted while its distance from the face $i_1$ of the reel I is diminished, and that, when the rack blocks are moved downward and away from the bottom plate H, the latter is lowered, while the distance between same and the face $i_1$ is increased.

The angle which the line in which the rack blocks move, forms with the horizontal line, is a function of the diameter of the circle the bottom plate is part of, and of the required limits of its adjustment in regard to the face $i_1$ of the reel I.

In Fig. 11 for instance the racks N, $N_1$ and $N_2$ and their gearing have been so arranged that all the points of the bottom plate H are at any position thereof equally distant from the face $i_1$ of the reel I. When the plate H standing at its lowest point, the limit farthest away from the face of the reel, is lifted by means of the rack $N_2$ vertically upward to its highest point, the limit nearest to the face of the reel, the sides of the plate H must be moved the same amount toward the face of the reel, and therefore the racks N and $N_1$ must compress these sides—N at the outlet and $N_1$ at the inlet of the molding channel—this same distance. By these lifting and compressing movements of the plate H the diameter of the circle of which it forms a half, and the center of which is identical with the center of the reel I, is shortened by double the length of the distance for which the plate H was moved toward the face of the reel, that is double the distance of the limits of its possible adjustments. Thus, each top point of the half circle of the plate H is lifted above its horizontal center line a distance equal to one fourth of the difference of the circumferences of the two circles of which the plate H at its position nearest to and at its position farthest away from the face $i_1$ of the reel I is a part. The angle which the racks N and $N_1$ moving the sides of the bottom plate H make with the horizontal, is therefore in this example equal to the angle formed by the hypotenuse and the horizontal base of a right-angled triangle, the length of the base being equal to the difference of the limits of the possible adjustments of the plate H, and the length of the upright of this triangle being equal to one fourth of the difference of the circumferences of two circles the diameters of which are those of the plate H when at the limit nearest to and at the limit farthest away from the face $i_1$ of the reel I.

The teeth $n_{15}$ and $n_{16}$ of the rack blocks $n_6$ and $n_7$ mesh with the teeth of the pinions $n_{18}$ and $n_{19}$ fixed to the common shaft $n_{21}$ on one side and the common shaft $n_{22}$ on the opposite side of the bottom plate H. These shafts are rotated in bearings $n_{24}$ and $n_{25}$ arranged in the legs S and $S_1$ of the framework of the machine, and bear at the part situated outside the same, bevel wheels $n_{27}$ and $n_{28}$ meshing with the bevel wheels $n_{30}$ and $n_{31}$ both of which are fixed to the shaft $n_{33}$, turned by means of the hand wheel $n_{35}$ in bearings carried by brackets $n_{34}$ fixed to the legs S and $S_1$ of the machine. The bevel wheels $n_{30}$ and $n_{31}$ are arranged on the shaft $n_{33}$ in such a manner that they work in opposite direction to each other turning the pair of pinions $n_{18}$ and $n_{19}$ situated at one side of the bottom plate H in opposite direction to the other pair situated at the opposite side; thus, the sides of the bottom plate H are moved to or from its center and lifted at the same time by simply turning the hand wheel $n_{35}$.

The bearer bar $n_1$ holding the lowest point of the bottom plate H, is fixed to the pair of rack blocks $n_8$ sliding in a vertical direction in the channels formed by the back blocks $n_{11}$ and the stop blocks $n_{14}$. The back blocks $n_{11}$ are attached to the center legs $S_2$ of the machine. The teeth $n_{17}$ of the rack blocks $n_8$ mesh with the pinions $n_{20}$ fixed to the common shaft $n_{23}$ which turns in the bearings $n_{26}$ arranged in the legs $S_2$ of the framework of the machine, and carries at the same side of the latter at which the shaft $n_{33}$ and the hand wheel $n_{35}$ are attached, the bevel wheel $n_{29}$ meshing with the bevel wheel $n_{32}$ fixed to the shaft $n_{36}$ turning in bearings of the supports $n_{37}$ attached to the legs $S_1$ and $S_2$ of the machine. The shaft $n_{36}$ is provided at its upper end with the bevel wheel $n_{38}$ meshing with the bevel wheel $n_{39}$ fixed to the shaft $n_{33}$ so that by turning the hand wheel $n_{35}$ also these bevel wheels and pinions are moved, and thereby the bottom bearer bar $n_1$ and the lowest point of the bottom plate H are adjusted in a vertical direction.

In the construction shown in the drawings, the bevel wheels $n_{27}$, $n_{28}$, $n_{29}$, $n_{30}$, $n_{31}$, $n_{32}$, $n_{38}$ and $n_{39}$ are arranged so that the shafts $n_{21}$, $n_{22}$, and $n_{23}$ they simultaneously drive when the hand wheel $n_{35}$ is turned, revolve with exactly the same velocity, and the size of the two side pairs of pinions $n_{18}$ and $n_{19}$ fixed to the shafts $n_{21}$ and $n_{22}$ is such in proportion to that of the bottom pair of pinions $n_{20}$ fixed to the shaft $n_{23}$ that by means of the racks $n_6$ and $n_7$ the two bearer bars $n_1$ of the side adjustments N and $N_1$ and thereby the sides of the bottom plate H are moved in relation to the face $i_1$ of the reel I to the same degree as by means of the racks $n_8$ the bearer bar $n_1$ of the bottom adjustment $N_2$, and thereby the lowest point of the plate H. In this way, the distance between the face $i_1$ of the reel I and the bottom plate H remains the same at all points at any position of the latter.

If it is desired that this distance can be adjusted differently at different points, then the above named bevel wheels and pinons must be constructed and arranged accordingly.

The springs $o$ of the spring arrangements, O, $O_1$ and $O_2$, are contained in casings $o_1$ attached to the middle parts of the bearer bars $n_1$, their cross-section thus forming a ring. The springs $o$ are held in the casings $o_1$ by means of screw blocks and guided by guide rods $o_3$ screwed into the tubelike elevation $n_{41}$ of the guide blocks $n$. The casings $o_1$ and the guide rods $o_3$ of the two side appliances O and $O_1$ point in horizontal direction, and the openings $o_4$ in their screw blocks $o_2$ through which the guide rods $o_3$ pass, are widened so as to give the latter a certain play (Fig. 14 and Fig. 15), while the bottom appliance $O_2$ points vertically downward, and its screw block $o_5$ has an opening $o_6$ just large enough for the guide rods $o_3$ to pass through like through a stuffing box (Fig. 16). The screw blocks $o_2$ and $o_5$ are turned in the female threads provided in the upper part of the casing $o_1$ by means of the handles $o_7$. In order to prevent the screw blocks from slipping from the guide rods $o_3$ and out of the casing $o_1$, the former are provided at their end with cross bars $o_8$. The spring ends at the screw blocks $o_2$ and $o_5$ are kept in their place inside by the ringlike projections $o_9$ and outside by the casing $o_1$, and the spring ends at the bottom plate H are held in position in the annular cavity of the guide blocks $n$ between the tubular projection $n_{41}$ and the wider ringlike projection $n_{42}$ (Fig. 19). The resiliency of the bottom plate H is regulated by adjusting the tension of the springs $o$ by means of the screw blocks $o_2$, respectively $o_5$.

The outlet plate M (Fig. 9 and Fig. 10) connected by the cross-piece $h_1$ to the bottom plate H as already mentioned above, has an upward pointing part $m$ which forms the end part of the molding channel and is bent over at the top $m_1$ for the ready molded loaf of dough to slip easily over same onto the outlet chute P. At its upper part the outlet plate M is provided with two studs $m_2$ carrying the cross bar $m_3$ sliding in the slots $s_5$ arranged in the frame work $S_5$. This crossbar $m_3$ supports two hinges $p$ attached to the outlet chute P which consists of a straight iron plate provided at each side with a rim $p_1$ to guide the dough loaf onto the conveyer R. The chute is provided at its under side with brackets $p_2$ carrying the cross bar $p_3$ sliding in the slots $s_6$ arranged in the framework $S_5$. By means of the rod $m_3$ and the slots $s_5$, the top $m_1$ of the outlet plate M is always kept in its proper position above the chute P while moving upward or downward with the bottom plate H, the chute P following these movements at the same time.

The roller $r$ of the belt conceyer R (Fig. 6) rotates around its axle $r_1$, running in bearings $r_2$ provided in part $S_5$ of the framework, and is driven by means of the sprocket wheel $r_3$ attached to the axle $r_1$, and the chain $t_{16}$ from its sprocket wheel $i_8$ fixed to the axle $i_5$ of the reel I.

For operating the machine at first the different parts of the same must be adjusted according to the weight, size and qualities of the pieces of dough to be molded and to the size and shape of the ready molded loaf to be obtained from the piece of dough placed in the machine. In the machine shown in the drawings, the distance of the two pairs of rollers, B and $B_1$, and $B_2$ and $B_3$, are regulated by turning the hand wheels $d_7$ belonging to their adjustment arrangements, and the resiliency of the upper rollers $B_1$ and $B_3$ is adjusted by regulating the weights E and $E_1$. The folding member F is adjusted by means of the screws $f_2$ and $f_3$. The size of the molding channel is regulated by turning the hand wheel $n_{35}$, and the resiliency of the bottom plate H by adjusting the screw blocks $o_2$ and $o_5$ of the spring devices O, $O_1$ and $O_2$.

The pieces of dough to be shaped into loaves are then placed, one after the other, into the hopper A, from which they enter the sheeting apparatus; they are rolled out to a sheet between the rollers B and $B_1$, and $B_2$ and $B_3$; the resulting sheets are folded up into cylindrical rolls by means of the folding roller G and folding member F, and pass then over the inlet plate K into the funnellike passage formed by the lower part of the plate K and the intermediate plate L with the face $i_1$ of the rotating reel I, and from there into the molding channel proper formed by the latter and the stationary resilient bottom plate H. The ready-shaped loaves of dough leave then through the upper part of the molding channel formed by the face $i_1$ of the reel and the outlet plate M, and drop over the top $m$ of the latter onto the chute P and the conveyer R which takes them to their destination.

I claim:

1. In a dough molding machine, the combination with a pair of rotary adjacent rollers, of a stationary frame carrying the axle of one roller, a movable block carrying the axle of the other roller, projections provided in the stationary framework at each side of the roller and containing female threads, guide rods at each side of the rollers and provided with threads fitting into the female threads of the projections, stops arranged at the guide rods between the stationary framework and the movable block, bevel wheels arranged at the ends of the guide rods protruding over the stationary frame opposite to the stops, bevel wheels meshing with these bevel wheels and attached to a common axle, a hand wheel working same, hooks arranged at the movable block, wires attached to the hooks and a weight carried by the wires, the weight and wires being so arranged as to press the movable block against the stops of the guide rods.

2. In a dough molding machine, a device for sheeting dough, consisting of a rotary roller the axle of which rotates in bearings fixed to the stationary framework of the machine, guides arranged at each side of the roller in this framework, means consisting of a screw arrangement for simultaneously adjusting the guide rods, a second rotary roller placed in alinement with the first roller between the said guide rods, a guide block sliding on the latter and carrying the bearings for the axle of the second roller, stops provided at the guide rods between the stationary frame and the movable block, a weight and wires connecting same to the movable block and arranged in such a way that the movable block is pressed against the said stops.

3. In a dough molding machine, the combination with rotary rollers adapted to roll out the dough to a sheet, of means consisting of screwrods and bevel gearing for adjusting the distance between each pair of such rollers, resilient means worked by weights pressing on the movable rollers for keeping this distance, a folding member curved on its surface turned toward the passing sheet of dough, convex in its upper and concave in its lower part, means consisting of screw studs fixed to the said member and of slots provided in the framework of the machine for adjusting the position of the folding member, and a folding roller revolving toward the concavity of the folding member and quicker than the sheeting rollers, the folding member and the folding roller being so arranged underneath the latter and in regard to each other, that the sheet of dough leaving the sheeting rollers meets on its nearly perpendicular downward passage the folding roller just above its center, is driven by same into the concavity of the folding member, and thereby, folded up into a roll.

4. In a dough molding machine, comprising rotary adjustable rollers adapted to roll out the dough to a sheet, means consisting of screw rods with stops and bevel gearing for adjusting the distance between each pair of such rollers, resilient means consisting of weights for keeping this distance, a curved adjustable folding member, a folding roller revolving toward the concavity of the folding member and quicker than the sheeting rollers, and so arranged in regard to the latter and to the folding member that the sheet of dough coming from the former is driven into the concavity of the latter and thus rolled up, a rotary reel, a plate fitting loosely between the sides of the reel and forming with its face and sides the molding channel, means consisting of racks for adjusting the distance of this plate from the face of the reel, and resilient means consisting of adjustable springs for keeping this distance.

5. In a dough molding machine comprising adjustable and resilient rollers adapted to roll out the dough to a sheet, a curved plate, a roller rotating toward the concavity of this curved plate and arranged so that the dough sheet leaving the sheeting rollers meets it just above its center and is then thrown into the concavity of the curved plate and folded up, a rotary reel, a stationary resilient bottom plate fitting into the space between the sides of the reel and forming with same and its face the molding channel, a curved, unmovable inlet plate fixed to the framework of the machine and so constructed and arranged as to facilitate the entrance of the folded-up rolls of dough into the molding channel, a flexible intermediate plate fixed to the top of the bottom plate and connecting loosely the latter and the inlet plate, a flexible outlet plate fixed to the upper part of the bottom plate opposite to the inlet plate and provided with a turned-over top, means consisting of racks for adjusting the distance of the bottom plate from the face of the reel, adjustable springs for keeping this distance, and means for allowing the intermediate and the outlet plate to follow the movements of the bottom plate without the distance of the top of the intermediate and of the top of the outlet plate from the face of the reel being altered.

6. In a dough molding machine, the combination with the rollers B and $B_2$ rotating with their axles $b$ and $b_9$ in bearings $b_1$ and $b_{10}$ fixed to the framework $S_4$ and the rollers $B_1$ and $B_3$ rotating with their axles $b_2$ and $b_{11}$ in bearings $b_3$ and $b_{12}$ fixed to the movable blocks $b_4$ and $b_{13}$, of guiderods $d$ arranged one at each side of the two pairs of rollers, B and $B_1$ and $B_2$ and $B_3$, working together to roll out the dough to a sheet, screw threads $d_1$ provided on the rods $d$, projections $s$ on the inside of the frame $S_4$, female threads $s_1$ provided in these projections for the screw threads $d_1$ of the rods $d$ to turn in, bevel gearings $D_2$ arranged to turn simultaneously and evenly the rods $d$ at each side of the rollers B and $B_1$, and $D_3$ adapted to turn simultaneously and evenly the rods $d$ at each side of the rollers $B_2$ and $B_3$, stops $d_2$ arranged at the rods $d$ to carry the movable blocks $b_4$ and $b_{13}$ and the weights E and $E_1$ pressing the movable blocks $b_4$ and $b_{13}$ down on the stops $d_2$ belonging thereto, substantially as shown.

7. A dough molding machine comprising a feed hopper, rotary rollers arranged in pairs and adapted to roll out the dough fed thereto into a sheet, a stationary frame carrying the lower set of rollers, movable blocks for each roller belonging to the upper set, guiderods adapted for these blocks to slide on and adjustably arranged at the said stationary frame, stops provided on the guiderods to hold the movable blocks, weights attached to the movable blocks and so arranged as to press these blocks against the said stops, stationary plates leading the dough sheet from one pair of rollers to the successive one, a curved plate situated underneath the last pair of rollers, a roller rotating quicker than these rollers and toward the concavity of the said curved plate, thus folding up the sheet into a roll, a stationary curved plate adapted to lead the rolls of dough thus produced into the final molding channel, a rotary reel, a bottom plate fitting into the annular channel of said reel, and, following the lower half of its circumference, forming with it the molding channel, a flexible plate fixed to the upper end of the said plate and sliding behind the plate leading the dough rolls into the channel, guide rods arranged at the bottom plate of the molding channel pointing outward and provided at their ends with stops, bars provided with openings and arranged so that the said guide rods slide therein between the bottom plate to which they are fixed and their stops, racks carrying the said bars, pinions working the racks, bevel-gearing working the pinions simultaneously, springs carried in casings fixed to the bars in the openings of which the guide rods slide, and so arranged as to press the stops of these guide rods against the said bars, thus holding the plate in the position adjusted by means of the racks, a flexible plate fixed to the bottom plate of the molding channel at its outlet and having a turned-over top, and a chute receiving the molded dough loaves from over the top of the latter plate and movably connected to same, both plates being provided with means to follow together the movements of the bottom plate forming the bottom of the molding channel without altering the distance between the turned-over top of the said flexible plate from the face of the reel.

8. A dough molding machine comprising the feed hopper A, the brake rollers B, $B_1$, $B_2$ and $B_3$, the bridge plate C, the adjustment devices D and $D_1$, the bevel gearings $D_2$ and $D_3$ working the said devices, the weight arrangements E and $E_1$, the folding member F, the folding roller G, the rotary reel I, the bottom plate H, the intermediate plate L, the outlet plate M, the rack adjustment devices N, $N_1$ and $N_2$, the spring devices O, $O_1$ and $O_2$ and the chute P, substantially as shown and described.

LOUIS CHARLES REESE.

Witnesses:
  EMELIE M. ANDRÉ,
  JEAN NIESSEN.

Copies of this patent may be obtained for five cents each, by addressing the "Commissioner of Patents, Washington, D. C."